H55/3
Sept. 3, 1968 G. C. WOLTERS 3,400,221
MUSIC DISTRIBUTION SYSTEM USING FM TRANSMISSION OVER HOUSE WIRING
Filed June 14, 1963
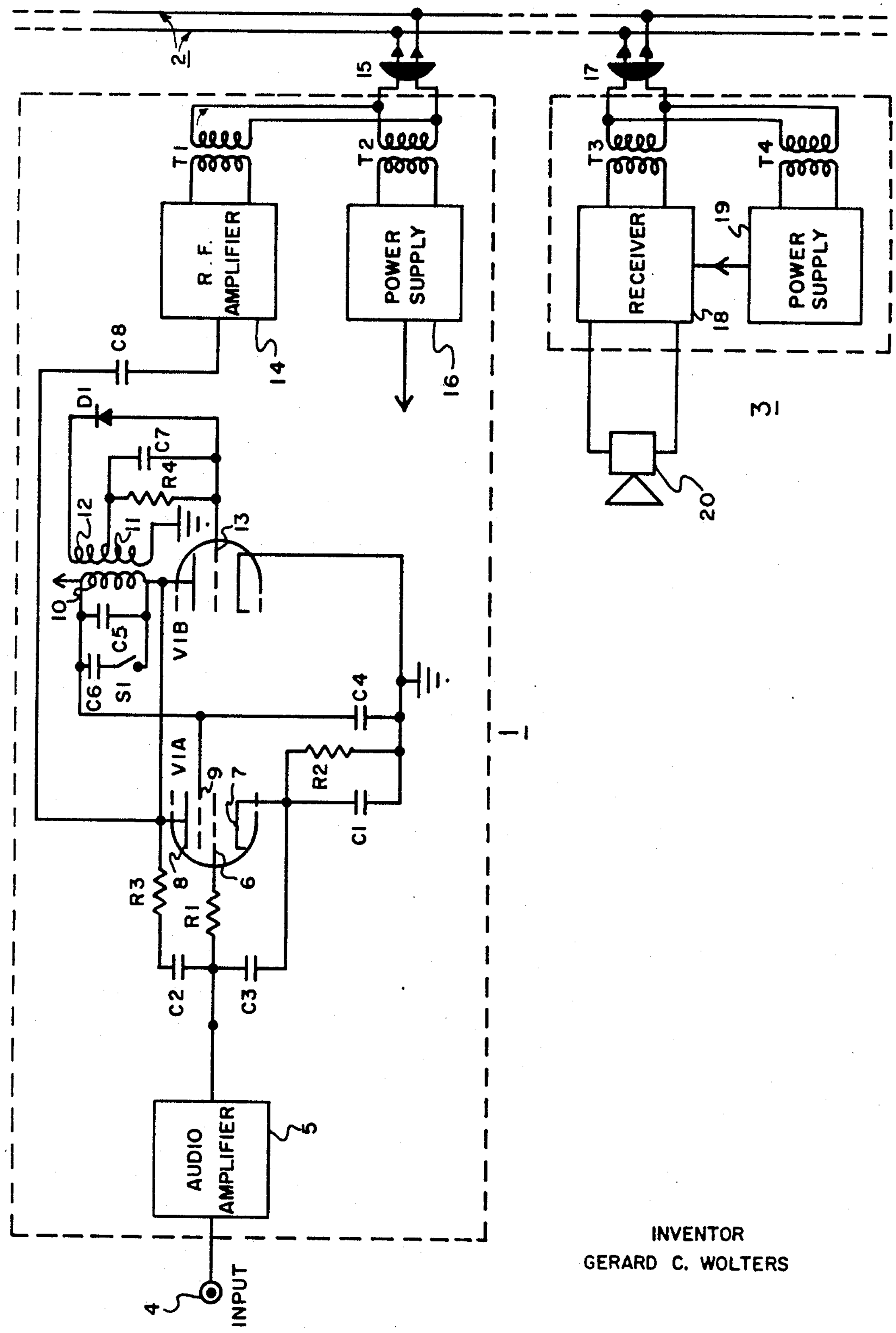
INVENTOR
GERARD C. WOLTERS

United States Patent Office 3,400,221
Patented Sept. 3, 1968

3,400,221

MUSIC DISTRIBUTION SYSTEM USING FM TRANSMISSION OVER HOUSE WIRING

Gerard C. Wolters, Decatur, Ill., assignor to General Electric Company, a corporation of New York Filed June 14, 1963, Ser. No. 287,807
2 Claims. (Cl. 179—2.5)

The present invention relates to a radio frequency carrier current communications system, such as a music distribution system and more specifically to an improved music distribution system which utilizes house wiring as the transmission medium.

It is known that an amplified RF carrier modulated in accordance with information to be conveyed can be superimposed on the 60 cycle line frequency of house wiring to effect transmission of the information to suitable receivers. The RF carrier can be either amplitude or frequency modulated, frequency moduation being generally more desirable since noise, which is fundamentally an amplitude effect, can be easily eliminated without detriment to the information content of the carrier. However, although frequency modulation is more desirable, its use in a carrier current system necessitates rather extensive filtering to assure an RF carrier with a very low harmonic content. Such filtering is necessary since otherwise the operation of amplitude modulated (AM) broadcast receivers connected to or in close proximity to the house wiring would be adversely affected by harmonics. For example, an AM broadcast receiver, whose audio output signal is connected to a music distribution system transmitter, could be adversely affected by these harmonics, and extensive filtering would be required.

Accordingly, an object of the present invention is to provide an improved radio frequency carrier current communications system employing frequency modulated RF carrier current operation for use with house wiring.

Another object of my invention is to provide an improved music distribution system utilizing house wiring as the transmission medium, wherein extensive filtration of the frequency modulated RF carrier is obviated.

Still another object of the present invention is to provide an improved music distribution system capable of achieving a low harmonic content frequency modulated RF carrier to eliminate adverse effects upon AM broadcast receivers connected to or in the vicinity of the house wiring.

These and other objects are achieved in one embodiment of the invention through the use of a transmitter which develops a frequency modulated RF carrier output, the transmitter including an oscillator provided with suitable biasing circuitry to insure class A operation to thereby maintain a minimum harmonic content output.

The novel and distinctive features of the invention are set forth in the appended claims. The invention itself together with other objects and advantages thereof may best be understood by reference to the following description and accompanying drawing in which:

The single figure is a schematic and block diagram representation of the improved music distribution system of this invention.

Referring to the accompanying drawing, there is shown a home music distribution system comprising a transmitter 1 which imparts a low harmonic content, frequency modulated RF carrier to the house wiring 2. The modulated RF carrier becomes superimposed upon the 60-cycle line frequency and is transmitted by the house wiring to the receiver 3, the receiver 3 serving to convert the modulated carrier into an audible signal.

The transmitter 1 comprises an input terminal 4 to which is applied the desired audio input signal such as is available from a phonograph or similar device. The input signal is amplified by audio amplifier 5 and coupled to the grid 6 of reactance tube V1A through resistance R1. Cathode bias of the reactance tube V1A is achieved through the use of capacitor C1 and resistance R2 connected between the cathode 7 and ground. A feedback loop is provided between plate 8 and grid 6 of reactance tube V1A through resistance R3 and DC blocking capacitor C2. Capacitor C3 is connected between grid 6 and cathode 7 to develop the grid signal, the cathode 7 being essentially at ground potential since capacitor C1 is effectively an AC short. The capacitor C3 causes a 90° phase shift of the feedback AC signal to thereby cause the voltage on grid 6 to lag the plate voltage by 90°. Since the AC plate current and AC grid voltage will be in phase, the AC plate current will in effect lag the AC plate voltage by 90° causing the reactance tube V1A to exhibit an inductive characteristic. The screen grid 9 is maintained at AC ground through the use of a by-pass capacitor C4.

The reactance tube V1A is connected in parallel with the plate tank coil 10 of a tuned plate oscillator comprising tube V1B in such a manner that the oscillator output will be modulated in accordance with the signal at the grid 6 of reactance tube V1A. The plate tank coil 10 of the oscillator is tuned to the desired frequency by capacitor C5, an additional capacitance C6 being connected in shunt with the capacitance C5 upon the closing of switch S1 to thereby lower the resonant frequency of the tank to an alternate desired frequency, thus providing a selection of a selection of frequencies to insure optimum operation.

The plate tank coil 10 of the oscillator circuit is provided with a secondary winding comprised of sections 11 and 12. Section 11 of the secondary winding serves to regeneratively feed back a portion of the oscillator signal through capacitor C7 to the grid 13 of tube V1B to establish oscillation. The voltage developed across section 12 of the secondary is rectified by diode D1, filtered by capacitor C7 and developed across resistance R4 to provide a negative bias on the grid 13 of tube V1B. The bias thus developed maintains the tube V1B at an optimum operating point and insures clas A operation since the regenerative feedback signal is kept substantially smaller than the bias by making the number of turns of section 12 of the secondary winding considerably larger than that of section 11.

By maintaining the oscillator in class A operation, the modulated carrier output of the transmitter will contain a minimum harmonic content. Thus, undesirable harmonics will not be produced and adverse effects upon AM broadcast receivers connected to or in the vicinity of the house wiring will be eliminated. Hence, the difficulty and cost involved in removing undesirable harmonics is obviated.

The output of the oscillator, as varied in frequency in accordance with the reactance presented by the tube V1A, is then coupled through capacitor C8 to RF amplifier 14. The amplified output of the RF amplifier 14 is coupled through a transformer T1 to the house wiring by the use of a suitable plug 15. The plug 15 also serves to connect the power supply transformer T2 to the line, the transformer T2 in conjunction with power supply 16 serving to develop suitable DC operating voltages for the transmitter.

The receiver 3 is coupled to the house wiring through the use of a suitable plug 17, the plug serving to couple the RF carrier through transformer T3 to suitable receiver circuitry 18. The plug also serves to couple power from the line to power supply transformer T4 and associated power supply circuitry 19, which provides DC power to operate the receiver. The output of the receiver 18 is connected to a loudspeaker 20 to provide an audible reproduction of the desired information.

In the operation of the system, an audio input at terminal 4 of the transmitter is amplified and caused to vary the reactance of reactance tube V1A which accordingly frequency modulates the output of the oscillator tube V1B. The tube V1B comprises a feedback oscillator which is maintained in class A operation through the use of a rectified portion of the developed output to establish the bias level. The modulated output of the oscillator is amplified by RF amplifier 14 and transformer coupled through transformer T1 to the house wiring. The modulated RF carrier, which is maintained at a low harmonic content due to the class A operation of the oscillator section of the transmitter, is superimposed upon the 60 cycle line frequency. The modulated carrier is coupled through a suitable plug to receive circuitry where discrimination and amplification is effected to develop an audio signal which is utilized to drive loudspeaker 20 to provide the desired audible output. In this manner the desired information is transmitted by the housing wiring and harmonics which could interfere with AM broadcast receivers on the line or nearby, are effectively eliminated without the necessity of filtering or highly selective circuitry.

Although the invention has been described with respect to certain specific embodiments, it will be appreciated that modifications and changes may be made by those skilled in the art without departing from the spirit of the invention. Therefore, it is intended by the appended claims to cover all such modifications and changes that fall within the true spirit and scope of the invention.

What I claim as new and desire to secure by Letters Patent of the United States is:

1. For use in a frequency modulated carrier system employing house wiring as a communications medium, an improved transmitter for converting an audio input into a frequency modulated carrier, and applying said carrier to said wiring, said transmitter comprising:

(A) an oscillator including an amplifying tube and an oscillator coil, (1) said oscillator coil having a primary and first and second secondary windings, (2) said primary winding being connected in the plate circuit of said amplifying tube and having at least one capacitance connected in shunt therewith, (3) said first secondary winding being connected to the grid of said amplifying tube to develop a regenerative feedback signal on said grid, (4) said second secondary winding being connected to said grid through a unilateral conducting device so as to develop a negative bias voltage on the grid of said amplifying tube, and (5) said bias voltage having an amplitude substantially greater than said feedback signal, thereby to provide class A operation of said oscillator.

2. A music distribution system for causing a frequency modulated carrier to be transmitted over house wiring, said system comprising:

(A) a transmitter for converting an audio input into a frequency modulated carrier, (1) said transmitter including an oscillator, (B) said oscillator comprising a triode and an oscillator coil having a primary and first and second secondary windings, (1) said primary winding being connected in the plate circuit of said triode and having at least one capacitance connected in shunt therewith, (2) said first secondary winding being connected to the grid of said triode to develop a regenerative feedback signal on said grid, (3) said second secondary winding being connected to said grid through a unilateral conducting device so as to develop a negative bias voltage on the grid of said triode, and (4) said bias voltage having an amplitude greater than said feedback signal to insure class A operation of said oscillator, (C) means for biasing said oscillator to insure class A operation thereof, (D) means for applying said modulated carrier to the house wiring, (E) receiving means for converting said frequency modulated carrier into an audible signal, and (F) means for connecting said receiving means to the house wiring for supplying said modulated carrier to said receiving means.

References Cited

UNITED STATES PATENTS

| | | | |
|---|---|---|---|
| 2,189,287 | 2/1940 | Hershey | 179—2.5 X |
| 2,389,257 | 11/1945 | Halstead | 179—2.5 |
| 3,081,422 | 3/1963 | Cooper | 331—170 X |
| 3,199,051 | 8/1965 | Hills et al. | 331—117 X |

OTHER REFERENCES

Terman: "Electronic and Radio Engineering," 4th Ed., McGraw-Hill 1955, pp. 491 and 502.

Radiotron Designers Handbook, 4th Ed. 1953, p. 954.

ROBERT L. GRIFFIN, *Primary Examiner.*

J. T. STRATMAN, *Assistant Examiner.*